(12) United States Patent
Shiono

(10) Patent No.: US 8,960,884 B2
(45) Date of Patent: Feb. 24, 2015

(54) WHITE INK FOR INK JET RECORDING AND RECORDING APPARATUS

(71) Applicant: Seiko Epson Corporation, Tokyo (JP)

(72) Inventor: Shohei Shiono, Matsumoto (JP)

(73) Assignee: Seiko Epson Corporation (JP)

( * ) Notice: Subject to any disclaimer, the term of this patent is extended or adjusted under 35 U.S.C. 154(b) by 233 days.

(21) Appl. No.: 13/716,520

(22) Filed: Dec. 17, 2012

(65) Prior Publication Data

US 2013/0155160 A1    Jun. 20, 2013

(30) Foreign Application Priority Data

Dec. 20, 2011    (JP) ................................. 2011-278690

(51) Int. Cl.
     *C09D 11/00*      (2014.01)
     *C09D 11/38*      (2014.01)
     *C09D 11/322*      (2014.01)

(52) U.S. Cl.
     CPC .............. *C09D 11/38* (2013.01); *C09D 11/322* (2013.01)
     USPC ........................................................ 347/100

(58) Field of Classification Search
     CPC ............................... C09D 11/322; C09D 11/38
     USPC .......................................................... 347/100
     See application file for complete search history.

(56) References Cited

U.S. PATENT DOCUMENTS

| | | | |
|---|---|---|---|
| 4,880,465 A | 11/1989 | Loria et al. | |
| 2006/0275606 A1* | 12/2006 | Mizutani | 428/404 |
| 2007/0044684 A1 | 3/2007 | Nakano et al. | |
| 2008/0138530 A1* | 6/2008 | Lin et al. | 427/466 |
| 2010/0105807 A1 | 4/2010 | Sugita et al. | |
| 2012/0188305 A1* | 7/2012 | Shiono | 347/20 |

FOREIGN PATENT DOCUMENTS

JP      2008-248008      10/2008

* cited by examiner

*Primary Examiner* — Manish S Shah
(74) *Attorney, Agent, or Firm* — Harness, Dickey & Pierce, P.L.C.

(57) ABSTRACT

White ink of the present invention for ink jet recording contains a white pigment having an average particle size of 200 nm to 400 nm and composed of metallic oxide, and the white ink satisfies Formula (1):

$$0.5 \times A \leq V \leq 1.3 \times A \quad (1)$$

where A represents the white pigment content (mass %) in the white ink, and V represents the proportion (%) of the volume of the white pigment which has completely settled in the white ink to the total volume of the white ink.

16 Claims, 1 Drawing Sheet

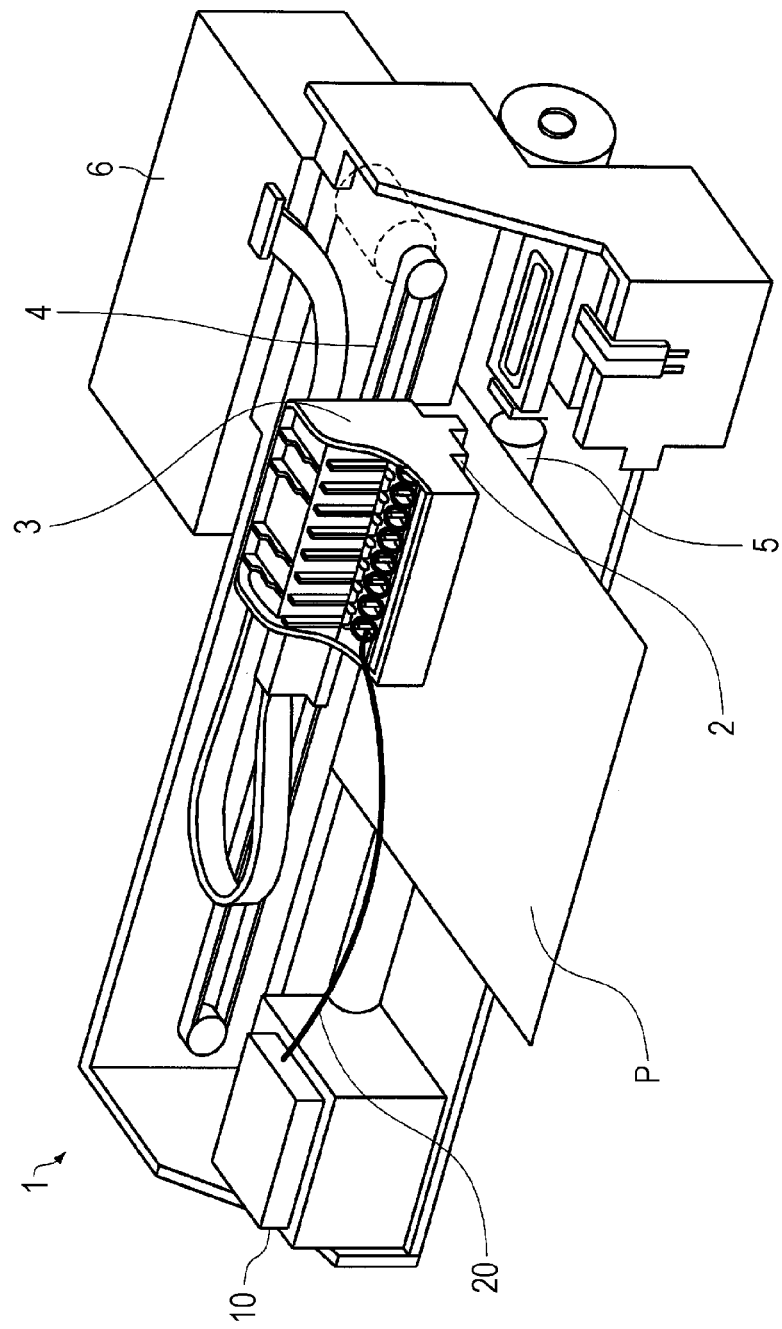

WHITE INK FOR INK JET RECORDING AND RECORDING APPARATUS

Priority is claimed under 35 U.S.C. §119 to Japanese Application No. 2011-278690 filed on Dec. 20, 2011, which is hereby incorporated by reference in its entirety.

BACKGROUND

1. Technical Field

The present invention relates to white ink for ink jet recording and a recording apparatus involving the white ink.

2. Related Art

An ink jet recording method has been typically known, in which ink droplets are ejected from a nozzle of an ink jet recording head to form characters and images.

In recent years, a wide variety of inks have come to be used in the ink jet recording method. In the case where color images are recorded on recording media having surface color which is not white, such as plastic or metallic products, white ink containing a white pigment is selected from such a wide variety of inks to hide the surface color in some situations, which can enhance color development of the color images. In recording of color images on a transparent sheet, the white ink is used to form a white shielding layer to decrease the transparency of the color images (see JP-A-2008-248008). Hence, the white ink has been required to exhibit high whiteness after being applied onto a recording medium.

The white pigment contained in the above-mentioned white ink settles in an ink jet recording apparatus due to the difference in specific gravity between the white pigment and a solvent in some cases.

In such a case, if a sediment containing the white pigment (also referred to as a hard cake) is soft to some extent, a fluid (an ink or a cleaning solution) is allowed to flow through the interior of the ink jet recording apparatus to discharge the sediment from a nozzle of an ink jet recording head.

If the white pigment-containing sediment becomes solidified or thick, however, the sediment cannot be completely removed by the flow of a fluid through the interior of the ink jet recording apparatus in some cases. In such a circumstance, the sediment may prevent proper supply of ink or cause defective ink ejection.

SUMMARY

An advantage of some aspects of the invention is that it provides white ink for ink jet recording and a recording apparatus involving the white ink, the white ink exhibiting satisfactory whiteness and high ejection stability.

Some aspects of the invention have the following advantages and applications.

A first aspect of the invention provides white ink for ink jet recording, the white ink containing a white pigment having an average particle size of 200 nm to 400 nm and composed of metallic oxide, wherein the white ink satisfies Formula (1):

$$0.5 \times A \leq V \leq 1.3 \times A \quad (1)$$

where A represents the white pigment content (mass %) in the white ink, and V represents the proportion (%) of the volume of the white pigment which has completely settled in the white ink to the total volume of the white ink.

The white ink for ink jet recording according to the first aspect exhibits high ejection stability and enables recording of images exhibiting high whiteness. In particular, even if sediment containing the white pigment is generated, the sediment is less likely to become solidified and thick; hence, defective ejection is less likely to be caused even in the case where an ink jet recording apparatus to which the white ink has been supplied is preserved for a long time.

In this case, the white ink for ink jet recording flows through an ink channel and then is ejected from a nozzle of an ink jet recording head, and in the case where a fluid is allowed to flow through the ink channel at a flow rate ranging from 70 ml/min·cm$^2$ to 260 ml/min·cm$^2$ after the white pigment is completely settled in the ink channel, the volume of a residual white pigment in the ink channel is not more than 30% of the initial volume (100%) of the white pigment which has completely settled in the ink channel.

The white ink for ink jet recording may further contain at least one of resin, saccharide, and particulate silica.

It is preferable that the resin content be in the range of 0.5 mass % to 9 mass %.

It is preferable that the resin include styrene-acrylic resins.

It is preferable that the metallic oxide be titanium dioxide.

It is preferable that the ink channel include an ink supply tube for supplying a fluid into the ink jet recording head and that the ink supply tube be composed of an elastomer.

It is preferable that the white ink for ink jet recording be substantially free from vinyl chloride resins.

A second aspect of the invention provides a recording apparatus involving the above-mentioned white ink for ink jet recording.

BRIEF DESCRIPTION OF THE DRAWING

The invention will be described with reference to the accompanying drawing, wherein like numbers reference like elements.

FIGURE is a perspective view illustrating a printer of an embodiment of the invention.

DESCRIPTION OF EXEMPLARY EMBODIMENTS

Preferred embodiments of the invention will now be described. The embodiments described below exemplify the invention. The invention should not be limited to the embodiments described below and can be variously modified without departing from the scope of the invention.

1. White Ink for Ink Jet Recording

The white ink for ink jet recording (hereinafter also referred to as "white ink") of the present embodiment has an average particle size of 200 nm to 400 nm, contains a white pigment composed of metallic oxide, and satisfies Formula (1):

$$0.5 \times A \leq V \leq 1.3 \times A \quad (1)$$

where A represents the white pigment content (mass %) in the white ink, and V represents the proportion (%) of the volume of the white pigment which has completely settled in the white ink to the total volume of the white ink.

The term "settle" herein means that a component contained in a solution is deposited after the solution is left to stand for a certain period of time and then accumulated to the bottom of the solution. For example, such a component in the white ink is the white pigment and may include substances bonded or adsorbed to the white pigment.

The expression "white pigment which has completely settled in the white ink" herein refers to the case in which an ink jet printer is filled with the white ink and then preserved at 20° C. and 50% relative humidity (RH) for substantially 6 months.

V in Formula (1) is herein also referred to as a volume fraction of sediment (%); in the case where the white pigment has completely settled in the white ink, the ink is separated into two layers, and the volume fraction of sediment (%) is determined by measuring the volume of the lower layer from the interface between the two layers. In particular, in the case where the white pigment has completely settled in the white ink, the white ink is separated into an upper layer of a transparent liquid (mainly composed of a solvent) and a lower layer of white sediment (mainly composed of the white pigment). Then, the proportion of the volume of the lower layer to the total volume of the upper and lower layers was determined. In this manner, the volume fraction of sediment (%) can be determined.

The inventor has intensively studied and then found that a volume fraction of sediment satisfying Formula (1) can prevent solidification and thickening of sediment generated in an ink jet recording apparatus and containing the white pigment. Satisfying Formula (1) enables production of white ink exhibiting excellent ejection stability.

Specifically, in the case where V is less than $0.5 \times A$ in Formula (1), the sediment strongly and tightly sticks to a channel, resulting in an unsatisfactory state. In addition, in the case where V is larger than $1.3 \times A$ in Formula (1), highly adhesive sediment resides in the channel, which impairs the quality of a white ink. In Formula (1), satisfying a relationship of $0.6 \times A \leq V \leq 1.0 \times A$ enables production of further satisfactory white ink.

The term "white ink" herein refers to an ink which enables recording with color generally accepted as "white" and includes an ink involving slight coloration. The term also includes ink which is called "white ink" and is sold under the name of "white ink" while containing a pigment. Furthermore, the term also includes ink which satisfies the following requirement: in the case where ink is used for recording on photo paper "glossy" manufactured by SEIKO EPSON CORPORATION in 100% or higher duty or in an amount which enables a surface of the photo paper to be sufficiently coated, measurement of the brightness (L*) and chromaticity (a* and b*) of the ink provides the results of $70 \leq L^* \leq 100$, $-4.5 \leq a^* \leq 2$, and $-6 \leq b^* \leq 2.5$, the measurement being carried out with a spectrophotometer "Spectrolino" (product name, manufactured by GRETAG MACBETH AG) under conditions of a light source: D50, viewing angle: 2°, color density: DIN NB, white reference: Abs, filter: No, and measurement mode: Reflectance.

The white ink of the present embodiment is used to record images on recording media having a color which is not white, such as plastic or metallic products, in some cases. In this case, for instance, the white ink is used for formation of an undercoat layer to hide the color of the recording media or decrease the transparency of color images. The white ink of the present embodiment may be used in any other application and applied to white recording media.

1.1. White Pigment

The white ink of the present embodiment contains the white pigment composed of metallic oxide. Examples of the metallic oxide include titanium dioxide, zinc oxide, silica, alumina, and magnesium oxide. Among these, preferred is titanium dioxide which exhibits excellent whiteness and abrasion resistance.

The white pigment does not include particles having a hollow structure such as disclosed in U.S. Pat. No. 4,880,465. This is because the hollow particles have high bulk and therefore do not satisfy Formula (1).

The white pigment has a volume-based average particle size (hereinafter referred to as "average particle size") of 200 nm to 400 nm. The white pigment having an average particle size within this range, especially not less than the lower limit thereof, enables recording of images exhibiting excellent whiteness. In addition, the white pigment having an average particle size within the above range, especially not more than the upper limit thereof, enables production of white ink having excellent ejection stability.

The average particle size of the white pigment can be measured with a particle size distribution analyzer based on a laser diffraction-scattering technique. Examples of such a particle size distribution analyzer include a particle size distribution analyzer utilizing dynamic light scattering (for example, "Microtrac UPA" commercially available from NIKKISO CO., LTD.).

The white pigment content (solid content) is in the range of preferably 1% to 30%, more preferably 1% to 20% relative to the total mass of the white ink. The white pigment content within these ranges, especially not less than the lower limit thereof, contributes to an enhancement in color density, such as whiteness, in some cases. The white pigment content within the above ranges, especially not more than the upper limit thereof, contributes to a reduction in nozzle clogging in some cases.

1.2. Resin

The white ink of the present embodiment may contain resin. The resin functions to fix the white ink onto recording media and disperse the white pigment in the white ink.

Examples of the rein include traditional resins such as acrylic resins, styrene-acrylic resins, fluorene resins, urethane resins, polyolefin resins, rosin-modified resins, terpene resins, polyester resins, polyamide resins, epoxy resins, and ethylene-vinyl acetate copolymer resins; and polyolefin wax. These resins may be used alone or in combination.

Among these resins, preferred is styrene-acrylic resins because such resins have a smaller effect of increasing the viscosity of sediment.

Examples of styrene-acrylic resins include styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers. These copolymers may have any copolymer structure and may be random copolymers, block copolymers, alternating copolymers, and graft copolymers. Commercially available products may be used as the styrene-acrylic resins. Examples of such commercially available products include YS-1274 (manufactured by SEIKO PMC CORPORATION, solution) and JONCRYL 61J (manufactured by BASF Japan Ltd., solution).

In the case where the white ink contains the resin, the resin content is preferably in the range of 0.5 mass % to 9 mass % relative to the total mass of the white ink. At the resin content within this range, the white pigment-containing sediment is less likely to become solidified or thick.

Preferably, the white ink of the present embodiment is substantially free from vinyl chloride resins. This is because vinyl chloride resins increase the viscosity of the white pigment-containing sediment in some cases.

The expression "substantially free from vinyl chloride resins" means, for example, that the vinyl chloride content in the ink is not more than 0.1 mass %, preferably not more than 0.05 mass %, and more preferably not more than 0.01 mass %.

1.3. Silica Particles

The white ink of the present embodiment may contain particulate silica ($SiO_2$). The particulate silica functions to suppress solidification of the white pigment-containing sediment. In particular, the particulate silica intrudes between the white pigment particles and then functions as a spacer, which can suppress the solidification of the sediment.

The particulate silica is preferably added in the form of a colloidal solution (colloidal silica) in which the particulate silica and water are dispersed in an organic solvent, which enables the particulate silica to be readily dispersed in the ink. Commercially available products may be used as the particulate silica; examples of such commercially available products include Quartrons PL-1, PL-3, and PL-7 manufactured by FUSO CHEMICAL CO., LTD.; and SNOWTEXs XS, OXS, NXS, and CXS-9 manufactured by Nissan Chemical Industries, Ltd.

In the case where the white ink contains the particulate silica, the particulate silica content is in the range of preferably 0.1 mass % to 5 mass %, more preferably 0.5 mass % to 3 mass % relative to the total mass of the white ink. At the particulate silica content within these ranges, the effect of preventing the solidification of sediment is further enhanced in some cases.

The preferred volume-based average particle size of the particulate silica is 30 nm to 120 nm. The particulate silica having an average particle size within this range desirably functions as a spacer of the white pigment. A ratio of the average particle size of the white pigment to the average particle size of the particulate silica is preferably 3:1 to 7:1, more preferably 3.5:1 to 6.5:1. The volume-based average particle size of the particulate silica can be measured as in the measurement of the volume-based average particle size of the white pigment.

1.4. Saccharides

The white ink of the present embodiment may contain saccharides. The saccharide functions to enhance the wettability of the white ink for a reduction in nozzle clogging in an ink jet recording head and suppress the solidification of sediment.

Saccharide may be a combination of monosaccharide and di- or higher saccharide, monosaccharide alone, or di-or higher saccharide alone. Saccharide to be used is appropriately determined depending on a demanded benefit. In particular, in the case of emphasizing an effect of preventing the solidification of sediment, the white ink may contain only di- or higher saccharide (not containing monosaccharide). In the case of using di- or higher saccharide alone, disaccharide and tri- or higher saccharide may be employed.

The white ink of the present embodiment may contain monosaccharide and di- or higher saccharide (such as oligosaccharides (including tri- and tetra-saccharides) and polysaccharides). Examples of the monosaccharide and di- or higher saccharide include glucose, ribose, mannitol, mannose, fructose, xylose, arabinose, galactose, aldonic acid, glucitol, sorbitol, maltose, cellobiose, lactose, sucrose, trehalose, and maltotriose. The term "polysaccharides" herein broadly refers to a variety of saccharides and includes substances occurring in nature, such as alginic acid, α-cyclodextrin, and cellulose. Derivatives of these saccharides include reducing sugars of the above saccharides, for example, sugar alcohol (represented by the formula $HOCH_2(CHOH)_nCH_2OH$ (n is an integer from 2 to 5)), oxidized sugars (such as aldonic acid and uronic acid), amino acid, and thiosugar. Although types of saccharide are not specifically limited, preferred are reducing sugars, specifically, glucose and fructose.

In the case where the white ink contains monosaccharide and di- or higher saccharide, the monosaccharide content is preferably in the range of 5 mass % to 50 mass %, more preferably 20 mass % to 45 mass % relative to the entire saccharide content in the white ink. Owing to the monosaccharide content within these ranges, the saccharide functions as a moisturizing agent, so that nozzle clogging in a recording head can be prevented. Furthermore, saccharide is adsorbed to the white pigment particles and therefore prevents the aggregation of the particles, which can prevent the solidification of the white pigment-containing sediment which has settled to the bottom of the ink. In this case, the white ink further preferably contains trisaccharide (a kind of di- or higher saccharides). The trisaccharide content is not specifically limited and is preferably in the range of 3 mass % to 90 mass %, more preferably 25 mass % to 85 mass %. In the case where monosaccharide and di- or higher saccharide are added to the ink, the monosaccharide and the di- or higher saccharide may be separately added, or the mixture of the monosaccharide and the di- or higher saccharide (e.g., syrup) may be added.

Examples of commercially available reducing sugar include HS-500, HS-300, HS-60, HS-30, and HS-20 (manufactured by HAYASHIBARA CO., LTD.).

In the case where the white ink contains the saccharide, the saccharide content is preferably in the range of 2 mass % to 15 mass %, more preferably 5 mass % to 10 mass % relative to the total mass of the white ink. At the saccharide content within these ranges, images to be recorded exhibit a satisfactory drying property, and the solidification of sediment can be desirably prevented.

1.5. Other Components

The white ink of the present embodiment may contain an organic solvent, a surfactant, and water.

Organic Solvent

The white ink may contain an organic solvent. The white ink may contain multiple organic solvents. Examples of the organic solvents contained in the white ink include 1,2-alkanediols, polyhydric alcohols, and pyrrolidone derivatives.

Examples of 1,2-alkanediols include 1,2-propanediol, 1,2-butanediol, 1,2-pentanediol, 1,2-hexanediol, and 1,2-octanediol. Such 1,2-alkanediols increase the wettability of the white ink to recording media and therefore contribute to highly uniform application of the white ink, which enables images having high quality to be formed on the recording media. In the case where the white ink contains such 1,2-alkanediols, the 1,2-alkanediol content is preferably in the range of 1 mass % to 20 mass % relative to the total mass of the white ink.

Examples of polyhydric alcohols include ethylene glycol, diethylene glycol, propylene glycol, dipropylene glycol, 1,3-propanediol, 1,4-butanediol, 1,5-pentanediol, 1,6-hexanediol, and glycerin. In the case where the white ink is used in an ink jet recording apparatus, such polyhydric alcohols can prevent the ink from being dried and then solidified on the nozzle surface of the head and therefore reduce clogging and defective ejection; hence, such polyhydric alcohols are preferably used. In the case where the white ink contains such polyhydric alcohols, the polyhydric alcohol content is preferably in the range of 2 mass % to 20 mass % relative to the total mass of the white ink.

Examples of pyrrolidone derivatives include N-methyl-2-pyrrolidone, N-ethyl-2-pyrrolidone, N-vinyl-2-pyrrolidone, 2-pyrrolidone, N-butyl-2-pyrrolidone, and 5-methyl-2-pyrrolidone. Such pyrrolidone derivatives can function as a good solubilizing agent for the resin component. In the case where the pyrrolidone derivatives are contained, the pyrrolidone derivative content is preferably in the range of 0.1 mass % to 25 mass % relative to the total mass of the white ink.

Surfactant

The white ink may contain a surfactant. Examples of the surfactant include silicone surfactants and acetylenic glycol surfactants.

Preferred silicone surfactants are polysiloxane compounds such as polyether-modified organosiloxane. Specific examples of the polysiloxane compounds include BYK-306, BYK-307, BYK-333, BYK-341, BYK-345, BYK-346, and BYK-348 (product names, commercially available from BYK Japan KK); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (product names, commercially available from Shin-Etsu Chemical Co., Ltd.). Such silicone surfactants enable the white ink to uniformly spread on recording media without the occurrence of uneven tint and blurs and are therefore preferably used. In the case where the white ink contains the silicone surfactant, the silicone surfactant content is preferably in the range of 0.1 mass % to 1.5 mass % relative to the total mass of the white ink.

Examples of the acetylenic glycol surfactants include 2,4,7,9-tetramethyl-5-decyne-4,7-diol, 3,6-dimethyl-4-octyne-3,6-diol, 3,5-dimethyl-1-hexyn-3-ol, and 2,4-dimethyl-5-hexyne-3-ol. Commercially available products can be used as the acetylenic glycol surfactants, and examples of such commercially available products include Surfynols 104, 104E, 104H, 104A, 104BC, 104DPM, 104PA, 104PG-50, 104S, 420, 440, 465, 485, SE, SE-F, 504, 61, DF37, DF110D, CT111, CT121, CT131, CT136, TG, and GA (product names, manufactured by Air Products and Chemicals, Inc.); Olfines B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (product names, manufactured by Nissin Chemical Industry Co., Ltd.); and Acetylenols E00, E00P, E40, and E100 (product names, manufactured Kawaken Fine Chemicals Co., Ltd.). As compared with any other surfactant, the acetylenic glycol surfactants can highly maintain a proper surface tension and interfacial tension and are substantially free from foamability. In the case where the white ink contains the acetylenic glycol surfactant, the acetylenic glycol surfactant content is in the range from 0.1 mass % to 1.0 mass % relative to the total mass of the white ink.

Water

The primary solvent (e.g., solvent contained in an amount of 50 mass % or higher relative to the total mass of the white ink) of the white ink of the present embodiment may be water or an organic solvent (e.g., alcohols, ketones, carboxylic acid esters, or ethers).

In the case where the white ink is an aqueous ink containing water as the primary solvent, the aqueous ink exhibits weak reactivity to a piezoelectric device used in a recording head and an organic binder or other components contained in a recording medium and can therefore reduce dissolution and corrosion thereof in some cases, as compared with non-aqueous (solvent) ink (for instance, an ink used for a recorded matter as is disclosed in U.S. Patent Application Publication No. 2007/0044684). In addition, the aqueous ink enables formation of images exhibiting a high drying property in some cases as compared with non-aqueous inks containing multiple solvents having high boiling points and low viscosity. Furthermore, the aqueous ink is less odorous than solvent inks, and the water content accounts for 50% of the composition of the aqueous ink, which is advantageously environmental-friendly.

Others

The white ink of the present embodiment may further contain a pH adjuster, a preservative, a fungicide, a corrosion inhibitor, and a chelating agent. Addition of these components to the white ink of the present embodiment can further improve the characteristics of the white ink in some cases.

Examples of the pH adjuster include potassium dihydrogen phosphate, disodium hydrogen phosphate, sodium hydroxide, lithium hydroxide, potassium hydroxide, ammonium, diethanolamine, triethanolamine, triisopropanolamine, potassium carbonate, sodium carbonate, and sodium hydrogen carbonate.

Examples of the preservative and fungicide include sodium benzoate, sodium pentachlorophenolate, sodium-2-pyridinethiol-1-oxide, sodium sorbate, sodium dehydroacetate, and 1,2-dibenzisothiazolin-3-one. Examples of commercially available preservative and fungicides include PROXELs XL2 and GXL (product names, manufactured by Arch Chemicals, Inc.) and Denicides CSA and NS-500W (product names, manufactured by Nagase ChemteX Corporation).

Examples of the corrosion inhibitor include benzotriazole.

Examples of the chelating agent include ethylenediaminetetraacetic acid and salts thereof (for example, disodium dihydrogen ethylenediaminetetraacetate).

The white ink of the present embodiment can be prepared with well-known apparatuses such as a ball mill, a sand mill, an attritor, a basket mill, and a roll mill as in preparation of traditional pigment inks. In the preparation of the white ink, membrane filters and mesh filters are preferably used to remove coarse particles.

1.6. Physical Properties

The white ink of the present embodiment preferably has a surface tension of 20 mN/m to 50 mN/m, more preferably 25 mN/m to 40 mN/m at 20° C. in terms of the balance between recording quality and reliability required for ink jet ink. A surface tension can be determined by measuring the surface tension of ink applied to a platinum plate at 20° C. with an automatic surface tensiometer CBVP-A3 (manufactured by Kyowa Interface Science Co., Ltd).

From the same standpoint described above, the white ink of the present embodiment has a viscosity of preferably 2 mPa·s to 15 mPa·s, more preferably 2 mPa·s to 10 mPa·s at 20° C. The viscosity can be determined with viscoelastic analyzer MCR-300 (commercially available from Physica Messtechnik GmbH) at 20° C. by increasing a shear rate from 10 to 1000 and then reading the viscosity at a shear rate of 200.

2. Ink Jet Recording Apparatus

The white ink of the present embodiment flows through an ink channel, is ejected from a nozzle of an ink jet recording head (hereinafter also referred to as "head") in the form of ink droplets, and then is applied onto a recording medium. Through this process, images (recorded matter) are formed on the recording medium with the white ink.

An ink jet recording apparatus including a head which can discharge the white ink of the present embodiment will now be described with reference to FIGURE. In the drawing, the scales of components are appropriately changed to illustrate the components in a visible scale. In the present embodiment, an ink jet printer (hereinafter simply referred to as "printer") exemplifies the ink jet recording apparatus. The invention should not be limited to the following apparatus configuration.

FIGURE is a perspective view illustrating the configuration of a printer 1 of the present embodiment. The printer 1 illustrated in FIGURE is a serial printer. The term "serial printer" means a printer including a carriage which moves in a predetermined direction and a head provided to the carriage, and the movement of the carriage allows the head to move to eject ink droplets onto a recording medium.

With reference to FIGURE, the printer 1 includes a carriage 3 to which a head 2 is provided, a carriage-moving mechanism 4 for moving the carriage 3 in the width direction of a recording medium P, and a medium-feeding mechanism 5 for transporting the recording medium P in a medium-feeding direction. In addition, the printer 1 includes a controller 6 which controls the general operation of the printer 1. The width direction of the recording medium P corresponds to a main-scanning direction (head-scanning direction). The medium-feeding direction corresponds to a sub-scanning direction (direction vertical to the main-scanning direction).

The head 2 is connected to an ink reservoir 10 via an ink supply tube 20 as illustrated in FIGURE, the ink reservoir 10 holding the white ink. A so-called off-carriage-type printer exemplifies the printer 1 of the present embodiment in which the ink reservoir 10 is connected to the casing of the printer 1 to supply ink to the head 2 through the ink supply tube 20; however, the invention should not be limited to such a configuration. For example, so-called on-carriage-type printers may be used, in which an ink cartridge is provided on a carriage. In addition, line head printers may be used, in which a carriage is not provided.

The ink supply tube 20 has a hollow tubal structure which allows ink to flow therethrough. The ink supply tube 20 may be composed of any material and is preferably composed of an elastomer. Examples of the elastomer include natural rubber, vulcanized rubber such as synthetic rubber, vinyl chloride elastomers, styrene elastomers, olefin elastomers (such as polyethylene and polypropylene), silicone elastomers, and fluorine elastomers.

In the case where a fluid is allowed to flow through the ink channel at a flow rate ranging from 70 ml/min·cm$^2$ to 260 ml/min·cm$^2$ after the white pigment contained in the white ink is completely settled in the ink channel, the volume of the residual white pigment in the ink channel is preferably not more than 40%, more preferably not more than 30% of the initial volume (100%) of the white pigment which has completely settled in the ink channel. Such a value of the volume of a residual white pigment is herein referred to as "persistence in a channel" in some cases. Elimination of 60% or higher (preferably 70% or higher) of the white pigment-containing sediment can sufficiently contribute to solution of decreased ejection stability due to the sediment.

Furthermore, success in elimination of 60% or higher (preferably 70% or higher) of the sediment by such a fluid flow at a relatively slow flow rate indicates that the sediment is less solidified. Part of the residual sediment in the ink channel can be therefore further removed during continuous operation of the printer.

Any fluid can be allowed to flow through the ink channel; for example, a cleaning fluid for washing the ink channel (e.g., a fluid containing water and glycerin) can be used in addition to the white ink of the present embodiment.

The ink channel herein refers to the channel between the ink reservoir from which a liquid is output and the nozzle of the head from which the liquid is ejected. For instance, in the printer 1, the ink supply tube 20 and an ink passage in the head 2 constitute the ink channel.

3. EXAMPLES

The invention will now be specifically described with reference to examples and comparative examples but should not be limited thereto.

3.1. Preparation of White Ink

Components shown in Tables 1 and 2 were mixed and then stirred, and each of the mixtures was filtered through a metallic filter having a pore size of 5 µm and then degased with a vacuum pump. White inks of Examples 1 to 14 and Comparative Examples 1 to 8 were produced in this manner.

The components shown in Tables 1 and 2 were as follows. In Tables 1 and 2, the amount of resin indicates its solid content. TIPAQUE CR-60, TIPAQUE CR-58, and TIPAQUE CR-50 (manufactured by ISHIHARA SANGYO KAISHA, LTD.) were used as the white pigment, and the average particle size of each white pigment was determined by appropriately adjusting dispersion conditions and stirring conditions to change the particle diameter thereof and then actually measuring the resulting particle size.

White Pigment

Titanium dioxide: average particle diameter 96 nm (product name "TIPAQUE CR-60", commercially available from ISHIHARA SANGYO KAISHA, LTD.)

Titanium dioxide: average particle diameter 144 nm (product name "TIPAQUE CR-60", commercially available from ISHIHARA SANGYO KAISHA, LTD.)

Titanium dioxide: average particle diameter 210 nm (product name "TIPAQUE CR-60", commercially available from ISHIHARA SANGYO KAISHA, LTD.)

Titanium dioxide: average particle diameter 266 nm (product name "TIPAQUE CR-50", commercially available from ISHIHARA SANGYO KAISHA, LTD.)

Titanium dioxide: average particle diameter 280 nm (product name "TIPAQUE CR-50", commercially available from ISHIHARA SANGYO KAISHA, LTD.)

Titanium dioxide: average particle diameter 321 nm (product name "TIPAQUE CR-50", commercially available from ISHIHARA SANGYO KAISHA, LTD.)

Titanium dioxide: average particle diameter 330 nm (product name "TIPAQUE CR-50", commercially available from ISHIHARA SANGYO KAISHA, LTD.)

Titanium dioxide: average particle diameter 332 nm (product name "TIPAQUE CR-50", commercially available from ISHIHARA SANGYO KAISHA, LTD.)

Titanium dioxide: average particle diameter 360 nm (product name "TIPAQUE CR-50", commercially available from ISHIHARA SANGYO KAISHA, LTD.)

Titanium dioxide: average particle diameter 399 nm (product name "TIPAQUE CR-58", commercially available from ISHIHARA SANGYO KAISHA, LTD.)

Titanium dioxide: average particle diameter 440 nm (product name "TIPAQUE CR-58", commercially available from ISHIHARA SANGYO KAISHA, LTD.)

Titanium dioxide: average particle diameter 520 nm (product name "TIPAQUE CR-58", commercially available from ISHIHARA SANGYO KAISHA, LTD.)

Resin

YS-1274 (product name, commercially available from SEIKO PMC CORPORATION, resin for dispersing the pigment, and a solution of styrene-acrylic acid copolymer)

JONCRYL 61J (product name, commercially available from BASF Japan Ltd., resin for fixation, and a solution of styrene-acrylic acid copolymer)

Vinyblan 711 (product name, commercially available from Nissin Chemical Industry Co., Ltd., resin for fixation, resin particles composed of vinyl chloride resin, and emulsion)

Saccharides

HS-500 (product name, commercially available from HAYASHIBARA CO., LTD., and reducing sugar)

Particulate Silica

PL-3 (product name, commercially available from FUSO CHEMICAL CO., LTD., and colloidal silica)

Other Components 2-pyrrolidone 1,2-hexanediol

Propylene glycol

BYK-348 (product name, commercially available from BYK Japan KK, and silicone surfactant)

Water

TABLE 1

| Composition of white ink | | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|
| White pigment | Titanium dioxide | 10 | 10 | 10 | 10 | 10 | 10 | 10 | 10 | 10 | 10 | 10 |
| Resin | YS-1274 | 3 | 3 | 3 | 3 | 3 | 3 | 3 | 3 | 3 | 3 | 3 |
|  | JONCRYL 61J | 3 | 3 | 3 | 3 | 3 | 3 | 3 | 3 | 3 | 3 | 3 |
|  | Vinyblan 711 |  |  |  |  |  |  |  |  |  |  |  |
| Saccharide | HS-500 |  |  |  |  |  |  |  |  |  |  |  |
| Particulate silica | PL-3 | 1 | 1 | 1 | 1 | 1 | 1 | 1 | 1 | 1 | 1 | 1 |
| Other components | 2-pyrrolidone | 2 | 2 | 2 | 2 | 2 | 2 | 2 | 2 | 2 | 2 | 2 |
|  | 1,2-hexanediol | 5 | 5 | 5 | 5 | 5 | 5 | 5 | 5 | 5 | 5 | 5 |
|  | Propylene glycol | 15 | 15 | 15 | 15 | 15 | 15 | 15 | 15 | 15 | 15 | 15 |
|  | BYK-348 | 0.5 | 0.5 | 0.5 | 0.5 | 0.5 | 0.5 | 0.5 | 0.5 | 0.5 | 0.5 | 0.5 |
|  | Water | Balance | Balance | Balance | Balance | Balance | Balance | Balance | Balance | Balance | Balance | Balance |
| Total (mass %) | | 100 | 100 | 100 | 100 | 100 | 100 | 100 | 100 | 100 | 100 | 100 |
| Average particle size (nm) of pigment | | 210 | 266 | 280 | 321 | 332 | 360 | 399 | 96 | 144 | 440 | 520 |
| Evaluation Test A | Whiteness $L^*$ value | 73.1 | 75.3 | 76.4 | 78.5 | 78.8 | 79.5 | 81.3 | 82.1 | 82.4 | 37.5 | 42.3 |
|  | Evaluation | B | A | A | A | A | A | A | C | C | A | A |
|  | Ejection stability | A | A | A | A | A | A | A | A | A | B | B |
|  | Volume fraction of sediment (%) | 6.8 | 7.2 | 7.4 | 7.8 | 7.8 | 7.8 | 7.9 | 6.1 | 6.2 | 8.0 | 7.8 |
|  | Persistence in channel (%) | 5 | 6 | 6 | 9 | 9 | 15 | 18 | 0 | 2 | 33 | 41 |

TABLE 2

| Composition of white ink | | Example 8 | Example 9 | Example 10 | Example 11 | Example 12 | Example 13 | Example 14 | Comparative Example 5 | Comparative Example 6 | Comparative Example 7 | Comparative Example 8 |
|---|---|---|---|---|---|---|---|---|---|---|---|---|
| White pigment | Titanium dioxide | 10 | 10 | 10 | 20 | 10 | 10 | 10 | 10 | 10 | 10 | 10 |
| Resin | YS-1274 | 3 | 3 | 6 | 6 | 3 | 3 | 3 | 0.5 |  |  | 15 |
|  | JONCRYL 61J | 3 | 3 | 3 | 3 | 3 | 3 |  |  |  |  | 12 |
|  | Vinyblan 711 |  |  |  |  |  |  | 3 |  |  |  |  |
| Saccharide | HS-500 |  | 10 |  |  |  |  |  |  |  |  |  |
| Particulate silica | PL-3 | 1 |  | 3 | 2 | 1 |  | 1 |  |  |  |  |
| Other components | 2-pyrrolidone | 2 | 2 | 2 | 2 | 2 | 2 | 2 | 2 | 2 | 2 | 2 |
|  | 1,2-hexanediol | 5 | 5 | 5 | 5 | 5 | 5 | 5 | 5 | 5 | 5 | 5 |
|  | Propylene glycol | 15 | 15 | 15 | 15 | 15 | 15 | 15 | 15 | 15 | 15 | 15 |
|  | BYK-348 | 0.5 | 0.5 | 0.5 | 0.5 | 0.5 | 0.5 | 0.5 | 0.5 | 0.5 | 0.5 | 0.5 |
|  | Water | Balance | Balance | Balance | Balance | Balance | Balance | Balance | Balance | Balance | Balance | Balance |
| Total (mass %) | | 100 | 100 | 100 | 100 | 100 | 100 | 100 | 100 | 100 | 100 | 100 |
| Average particle size (nm) of pigment | | 330 | 330 | 330 | 330 | 280 | 330 | 330 | 330 | 330 | 280 | 330 |
| Evaluation Test B | Volume fraction of sediment (%) | 7.8 | 5.2 | 13.0 | 14.5 | 7.4 | 5.0 | 5.6 | 2.0 | 2.0 | 2.4 | 14.0 |
|  | Persistence in channel (%) | 9 | 15 | 14 | 11 | 6 | 32 | 37 | 82 | 80 | 74 | 89 |

3.2. Evaluation Test A

In Evaluation Test A, effects of the particle size of the white pigment were analyzed.

3.2.1. Whiteness

Cartridges dedicated to an ink jet printer were filled with the white inks of Examples 1 to 7 and Comparative Examples 1 to 4 shown in Table 1, respectively. Each of the cartridges was attached to a printer PX-G930, and then a patterned solid image was recorded on a recording medium [product name "Lumirror", polyethylene terephthalate (PET) film manufactured by Toray Industries, Inc.] with the white ink. The recording was carried out at a resolution of 1440 dpi×1440 dpi and 100% Duty.

The term "Duty" was a value determined from the following formula.

Duty (%)=number of actually printed dots/(vertical resolution×horizontal resolution)×100 In the formula, the term "number of actually printed dots" indicates the number of actually printed dots per unit area, and the terms "vertical resolution" and "horizontal resolution" each indicate resolution in a unit length.

The patterned solid image was subjected to colorimetry with a colorimeter set "Gretag Macbeth Spetroscan and Spectrolino" (manufactured by X-Rite, Inc.) to determine an L* value, and the L* value was employed as the indicator of whiteness. Evaluation criteria are as follows, and results of the evaluation are shown in Table 1.

A: L* value of not less than 75;
B: L* value of not less than 70; and
C: L* value less than 70.

3. 2. 2. Ejection Stability

A nozzle check pattern was recorded on a recording medium (product name "Lumirror", PET film manufactured by Toray Industries, Inc.) with each of the white inks of Examples 1 to 7 and Comparative Examples 1 to 4 as in the evaluation test for whiteness.

The nozzle check pattern was observed to find the occurrence of nozzle failure and ink ejection in an unintended direction, thereby evaluating ejection stability. Evaluation criteria are as follows, and results of the evaluation are shown in Table 1.

A: No nozzle failure and ink ejection in an unintended direction; and
B: Occurrence of nozzle failure and ink ejection in an unintended direction 3.2.3. Volume Fraction of Sediment Cartridges dedicated to an ink jet printer PX-G930 were filled with the white inks of Examples 1 to 7 and Comparative Examples 1 to 4 shown in Table 1, respectively. Each of the cartridges was attached to the printer PX-G930, and the ink channel of the printer (ink supply tube and the interior of a head) was filled with the white ink. The printer was preserved for 6 months at 20° C. and 50% RH in a state in which the ink supply tube was kept in a horizontal position.

After the preservation, the ink had been separated into two layers in the ink supply tube, and the volume of the lower layer (volume of sediment) from the interface therebetween was measured. Then, the proportion of the volume of the lower layer to the total volume of the upper and lower layers [volume fraction of sediment (V %)] was determined. The determined values are shown in Table 1.

3.2.4. Persistence in Channel

After the evaluation test for a volume fraction of sediment, the cartridge filled with the white ink was replaced with a cartridge filled with a cleaning fluid [mixture of water and glycerin (10:7)]. The ink of 30 ml was removed from the nozzle of the head at a flow rate of 260 ml/min·cm². Then, the volume of residual sediment in the ink supply tube was measured, and the proportion of the volume of the residual sediment to the volume of the sediment obtained in the evaluation test for a volume fraction of sediment (%) [persistence in a channel (%)] was determined. The determined values are shown in Table 1.

3.3. Evaluation Test B

In Evaluation Test B, a volume fraction of sediment and persistence in a channel were analyzed further in detail.

3.3.1. Volume Fraction of Sediment

A volume fraction of sediment (%) was determined as in Evaluation Test A except that each of the white inks of Examples 8 to 14 and Comparative Examples 5 to 8 shown in Table 2 was used. The determined values are shown in Table 2.

3.3.2. Persistence in Channel

Persistence in a channel (%) was determined as in Evaluation Test A except that each of the white inks of Examples 8 to 14 and Comparative Examples 5 to 8 shown in Table 2 was used. The determined values are shown in Table 2.

3.4. Results of Evaluation 3.4.1. Results of Evaluation Test A

Each of the white inks used in Examples 1 to 7 contained the white pigment having an average particle size of 200 nm to 400 nm. Hence, the results of the evaluation in Table 1 demonstrate that excellent ejection stability was exhibited and images having high whiteness were recorded.

In contrast, each of the white inks used in Comparative Examples 1 and 2 contained the white pigment having an average particle size less than 200 nm. Hence, the results of the evaluation in Table 1 demonstrate that images exhibiting low whiteness were recorded. Each of the white inks used in Comparative Examples 3 and 4 contained the white pigment having an average particle size larger than 400 nm. Thus, unsatisfactory ejection stability was exhibited.

3.4.2. Results of Evaluation Test B

Each of the white inks used in Examples 8 to 14 satisfied Formula (1). Thus, the solidification and thickening of sediment were suppressed, and the sediment was able to be reduced to such an extent that the sediment did not largely influence ejection stability.

In contrast, each of the white inks used in Comparative Examples 5 to 8 did not satisfy Formula (1). Thus, sediment became solidified and thick, resulting in difficulty in sufficient elimination of the sediment.

The invention should not be limited to the above embodiments and can be variously modified. For example, the invention may include configurations substantially the same as those of the above embodiments (e.g., configurations having the same functions, processes, and results or configurations having the same advantages and effects). The invention may include configurations provided by changing non-essential parts of the configurations described in the above embodiments. The invention may include other configurations which provide the same advantages and effects as those described in the above embodiments. The invention may include configurations in which a traditional technique is added to the configurations described in the above embodiments.

What is claimed is:

1. A white ink for ink jet recording, the white ink comprising:
a white pigment having an average particle size of 200 nm to 400 nm and composed of metallic oxide, wherein the white ink satisfies Formula (1):

$$0.5 \times A \leq V \leq 1.3 \times A \quad (1)$$

where A represents the white pigment content (mass %) in the white ink, and V represents the proportion (%) of the volume of the white pigment which has completely settled in the white ink to the total volume of the white ink.

2. The white ink for ink jet recording according to claim 1, wherein the white ink for ink jet recording flows through an ink channel and then is ejected from a nozzle of an ink jet recording head, and in the case where a fluid is allowed to flow through the ink channel at a flow rate ranging from 70 ml/min·cm$^2$ to 260 ml/min·cm$^2$ after the white pigment is completely settled in the ink channel, the volume of a residual white pigment in the ink channel is not more than 30% of the initial volume (100%) of the white pigment which has completely settled in the ink channel.

3. The white ink for ink jet recording according to claim 2, wherein the ink channel includes an ink supply tube that supplies a fluid into the ink jet recording head, and the ink supply tube is composed of an elastomer.

4. A recording apparatus comprising:

the white ink for ink jet recording according to claim 3.

5. A recording apparatus comprising:

the white ink for ink jet recording according to claim 2.

6. The white ink for ink jet recording according to claim 1, further comprising at least one of resin, saccharide, and particulate silica.

7. The white ink for ink jet recording according to claim 6, wherein the resin content is in the range of 0.5 mass % to 9 mass %.

8. A recording apparatus comprising:

the white ink for ink jet recording according to claim 7.

9. The white ink for ink jet recording according to claim 6, wherein the resin is a styrene-acrylic resin.

10. A recording apparatus comprising:

the white ink for ink jet recording according to claim 9.

11. A recording apparatus comprising:

the white ink for ink jet recording according to claim 6.

12. The white ink for ink jet recording according to claim 1, wherein the metallic oxide is titanium dioxide.

13. A recording apparatus comprising:

the white ink for ink jet recording according to claim 12.

14. The white ink for ink jet recording according to claim 1, wherein the white ink is substantially free from vinyl chloride resins.

15. A recording apparatus comprising:

the white ink for ink jet recording according to claim 14.

16. A recording apparatus comprising:

the white ink for ink jet recording according to claim 1.

* * * * *